(12) United States Patent
McKinnon

(10) Patent No.: US 8,556,279 B2
(45) Date of Patent: Oct. 15, 2013

(54) HANDTRUCK

(76) Inventor: Peter Rodney McKinnon, The Junction NSW (AU)

( * ) Notice: Subject to any disclaimer, the term of this patent is extended or adjusted under 35 U.S.C. 154(b) by 340 days.

(21) Appl. No.: 12/315,937

(22) Filed: Dec. 8, 2008

(65) Prior Publication Data

US 2010/0140888 A1    Jun. 10, 2010

(51) Int. Cl.
  *B62B 1/00* (2006.01)
  *B60P 1/04* (2006.01)
  *B60B 1/00* (2006.01)

(52) U.S. Cl.
  USPC .................. 280/47.27; 414/490; 301/5.23

(58) Field of Classification Search
  USPC ............ 280/47.2, 7.21, 47.27, 47.131, 47.17, 280/47.18, 47.24, 47.264, 47.21, 47.26; 414/490; 301/5.23
  See application file for complete search history.

(56) References Cited

U.S. PATENT DOCUMENTS

| | | | |
|---|---|---|---|
| 1,326,679 A | 12/1919 | Macbeth et al. | |
| 3,040,371 A | 6/1962 | Rice et al. | |
| 3,363,735 A | 1/1968 | Hotchkiss | |
| 3,465,843 A | 9/1969 | Guinot | |
| 3,621,961 A | 11/1971 | Stumpf | |
| 3,647,236 A * | 3/1972 | Hayes | 280/641 |
| 3,655,212 A * | 4/1972 | Krass et al. | 280/641 |
| 3,666,285 A * | 5/1972 | Fertig | 280/47.12 |
| 3,789,947 A | 2/1974 | Blumrich | |
| 3,878,927 A | 4/1975 | Murakami | |
| 3,882,885 A | 5/1975 | McCain | |
| 3,944,094 A * | 3/1976 | Compton | 414/458 |
| 3,961,694 A | 6/1976 | Murakami | |
| 4,006,810 A | 2/1977 | Kornylak | |
| 4,223,753 A | 9/1980 | Bradbury | |
| 4,335,899 A | 6/1982 | Hiscock | |
| 4,460,189 A * | 7/1984 | Goff | 280/47.27 |
| 4,598,782 A | 7/1986 | Ilon | |

(Continued)

FOREIGN PATENT DOCUMENTS

| | | |
|---|---|---|
| AU | 561 380 82 | 5/1987 |
| DE | 3702660 | 8/1988 |

(Continued)

OTHER PUBLICATIONS

Facility Safety Management magazine dated Apr. 2011, Self-Supporting & Balanced.

(Continued)

*Primary Examiner* — J. Allen Shriver, II
*Assistant Examiner* — James M Dolak
(74) *Attorney, Agent, or Firm* — TraskBritt

(57) ABSTRACT

A handtruck or trolley (90) comprising: a handtruck frame (91) including a frame base (98) extending to an outward handle portion (97) of the handtruck frame, the handtruck frame generally lying in a first plane and having a front and a rear; a load support (95) mounted to the front of the handtruck frame and generally lying in a second plane inclined relative to the first plane; and a handtruck wheel assembly (60,80) mounted to the frame base, the handtruck wheel assembly comprising at least two sets of wheels (65a,60b,82a,82b), each set having a fixed main axis (6ba,106b) of rotation parallel to the first plane and capable of travel in a direction normal to the main axes, wherein the wheel or wheels of at least one of the sets of wheels is or are multidirectional and capable of travel in a lateral direction or in an angular direction having a vector component parallel to the main axes.

30 Claims, 11 Drawing Sheets

(56) References Cited

U.S. PATENT DOCUMENTS

| | | | |
|---|---|---|---|
| 4,681,330 A * | 7/1987 | Misawa | 280/47.2 |
| 4,715,460 A | 12/1987 | Smith | |
| 4,926,952 A | 5/1990 | Farnam | |
| D309,254 S | 7/1990 | Guile | |
| 4,981,203 A | 1/1991 | Kornylak | |
| 5,035,314 A | 7/1991 | Kornylak | |
| D318,791 S | 8/1991 | Guile | |
| 5,118,124 A | 6/1992 | Storay | |
| 5,213,176 A | 5/1993 | Oroku et al. | |
| 5,323,867 A | 6/1994 | Allard et al. | |
| 5,404,984 A | 4/1995 | Hagman | |
| 5,415,215 A | 5/1995 | Covert | |
| 5,445,399 A * | 8/1995 | Salvucci, Sr. | 280/47.27 |
| 5,536,074 A | 7/1996 | Hsu et al. | |
| 5,779,251 A * | 7/1998 | Meier | 280/47.2 |
| 5,947,491 A * | 9/1999 | Meier | 280/47.2 |
| 5,971,693 A | 10/1999 | Story et al. | |
| 6,340,065 B1 | 1/2002 | Harris | |
| 6,341,788 B1 * | 1/2002 | Ciccone | 280/47.28 |
| 6,357,765 B1 | 3/2002 | Heien | |
| 6,364,328 B1 * | 4/2002 | Stahler, Sr. | 280/47.18 |
| 6,394,203 B1 | 5/2002 | Harris | |
| 6,547,340 B2 | 4/2003 | Harris | |
| 6,619,823 B2 | 9/2003 | Dai | |
| 6,796,618 B2 | 9/2004 | Harris | |
| 6,857,707 B2 | 2/2005 | Guile | |
| 6,923,457 B2 * | 8/2005 | Nogaki | 280/47.27 |
| 7,083,174 B2 * | 8/2006 | Kane | 280/47.2 |
| 7,219,903 B2 * | 5/2007 | Grooters et al. | 280/47.27 |
| 7,500,682 B1 | 3/2009 | Del Marmol | |
| 2004/0256818 A1 * | 12/2004 | Amsili | 280/47.29 |
| 2007/0096541 A1 * | 5/2007 | Guile | 301/5.23 |

FOREIGN PATENT DOCUMENTS

| | | |
|---|---|---|
| GB | 1 408 820 | 10/1975 |
| GB | 2242173 | 9/1991 |
| GB | 2242858 | 10/1991 |
| WO | WO 00/12327 | 3/2000 |
| WO | WO 01/79007 | 10/2001 |
| WO | WO 02/24471 | 3/2002 |
| WO | WO 02/46031 | 6/2002 |
| WO | WO 2004/014667 | 2/2004 |

OTHER PUBLICATIONS

Material Handling Wholesaler magazine dated Oct. 2, 2009, New ergonomic Rotatruck Self Supporting Hand Truck nominated for annual NSW Safe Work Award.

dorsaVi outcome summary of handtruck assessment and comparison, date issued Jun. 5, 2011.

dorsaVi handtruck assessment-full report, dated Apr. 2011.

* cited by examiner

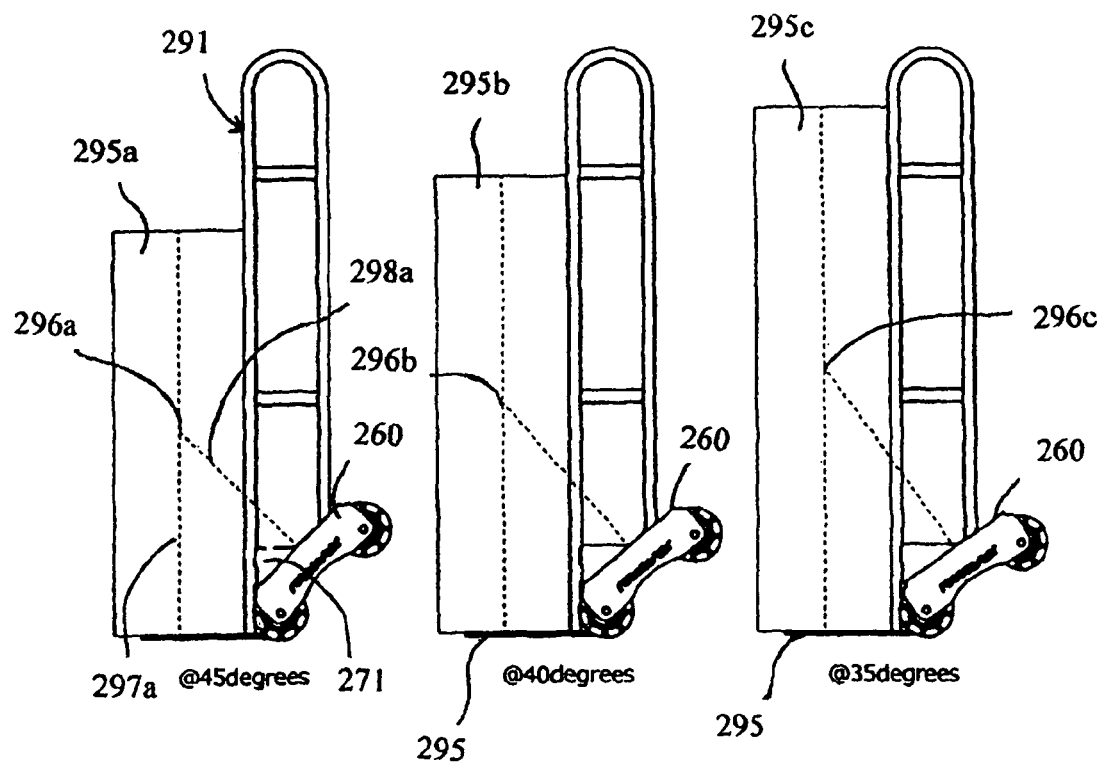
FIG. 11A  FIG. 11B  FIG. 11C

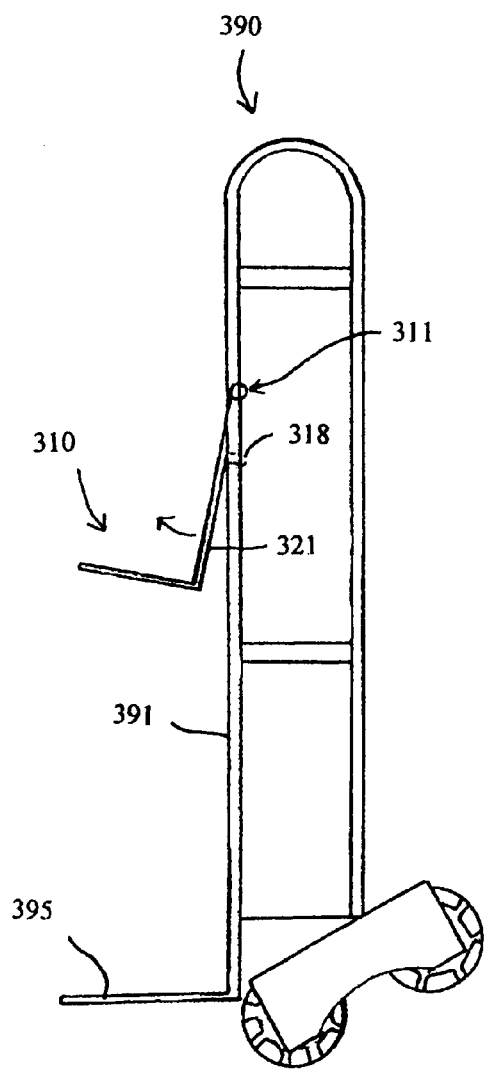 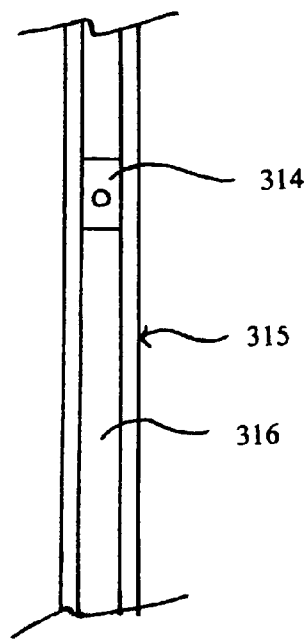
FIG. 12  FIG. 13

HANDTRUCK

BACKGROUND OF THE INVENTION

1. Field of the Invention

This invention relates to a hand trolley or handtruck. More particularly, this invention relates to a self-supporting handtruck capable of lateral movement.

2. State of the Art

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

BRIEF SUMMARY OF THE INVENTION

Handtrucks are commonly used to move small and/or heavy loads that are too heavy or bulky to be moved without a mechanical aid or to reduce the burden and effort or risk of injury inherent in lifting and carrying a load or a number of items in a load. A typical handtruck includes a pair of fixed wheels spaced to support a generally upright frame having handle means at its upper end and a generally horizontal load plate mounted to its lower end. If more than a single set of fixed wheels is employed, it will require the operator to disengage or lift the additional set of wheels off the ground to enable turning and rotational capability.

Prior art handtruck wheels are generally pneumatic or solid rubber wheels capable of rotating about a main axis and capable of moving in a generally forward or rearward direction. However, such wheels cannot move laterally or sideways. Furthermore, in the transporting position, the load must be balanced and partially supported by an operator supporting the handle means with the centre of mass of the load located rearward of the wheel axels.

Generally, in prior art handtrucks large wheels are required to permit easy negotiation of small bumps and imperfections in the supporting ground or floor surface and to negotiate larger obstacles such as steps or kerbs. Small handtruck wheels close to the load have not previously been used because of the difficulty of negotiating bumps and other ground-level obstructions with small wheels under heavy load. There is therefore characteristically a relatively large distance between the wheel axel and the centre of mass of the load, most notably when the handtruck is in a standing, upright position. In this upright position, significant levered rearward force may be required to be applied by the operator to pull the handle means towards the operator to place the handtruck in an inclined transporting position. In large wheeled handtrucks, the centre of the load must be lifted up and over the high centred axle of the large wheel. This has necessitated prior handtrucks to employ motorised or active tilting mechanisms. In Australian Patent No. 621047 (U.S. Pat. No. 5,118,124), a floating axle and rocker is described that improves the distribution and manipulation of load balance over the wheels.

Accordingly, the typical prior art handtruck presents health and safety issues, including the danger of back strain, and lack of productivity issues, such as poor manoeuvrability. The typical prior art handtruck requires that the operator lift virtually the entire load up and down kerbs or single steps, depending on the height of the obstacle and the diameter of the wheels, thereby exposing the operator to non-ergonomic positions and potential chronic strain or injury. Moreover, three-point turns are required to accurately position the load in tight places.

A common dual purpose handtruck (generally aluminium) has been described that has a set of castors on the end of a foldup handle that allows the handtruck to convert into a lay down platform trolley, having two fixed wheels at the front and two swivel castors at the back. These are used either in the standard handtruck mode or as flat platform trolley. In addition, handtrucks have been described that utilise swivel castors as a second set or pair of wheels. Such units appear to be generally used for heavy loads and is generally limited to operation or movement on either all four wheels or the front fixed wheels. These units could not effectively be moved, pivoted or the load levered only on the rear swivel wheels due to load instability and/or the risk of the load swinging/rotating about the caster, the load being offset if not properly aligned.

An object of the present invention is to ameliorate the aforementioned disadvantages of the prior art or to at least provide a useful alternative thereto.

BRIEF DESCRIPTION OF THE SEVERAL VIEWS OF THE DRAWINGS

Preferred features of the present invention will now be described with particular reference to the accompanying drawings. However, it is to be understood that the features illustrated in and described with reference to the drawings are not to be construed as limiting on the scope of the invention. In the drawings:

FIGS. 11A-11C are side elevations of a laden handtruck according to the embodiment shown in FIG. 10;

FIG. 12 is a schematic side elevation of a handtruck similar to the embodiment shown in FIG. 10;

FIG. 13 is a schematic inside side view of a frame rail and trapped runner according to the embodiment shown in FIG. 12;

DETAILED DESCRIPTION OF THE INVENTION

Figure 1:
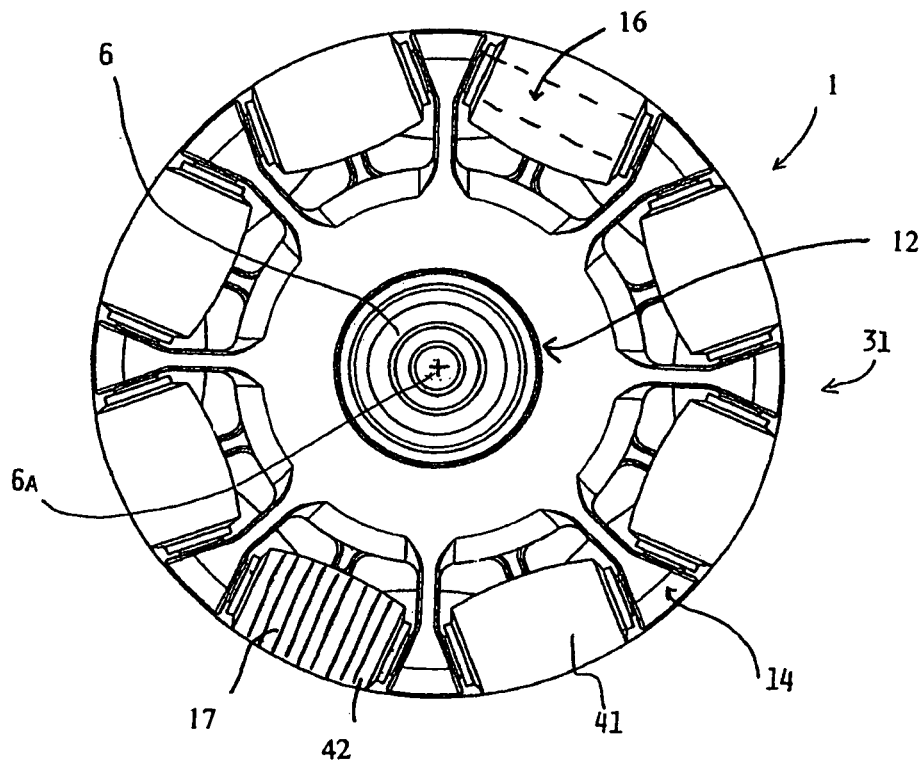
FIG. 1 is a side elevational view of a completed wheel suitable for use in various embodiments of the invention.

Accordingly, in one aspect of the invention there is provided a handtruck comprising:

a handtruck frame including a frame base extending to a handle portion of the handtruck frame, the handtruck frame generally lying in a first plane and having a front and a rear;

a load support mounted to the front of the handtruck frame and generally lying in a second plane inclined relative to the first plane; and a handtruck wheel assembly mounted to the frame base, the handtruck wheel assembly comprising at least two sets of wheels, each set having a fixed main axis of rotation parallel to the first plane and capable of travel in a direction normal to the main axes, wherein the wheel or wheels of at least one of the sets of wheels is or are multidirectional and capable of travel in a lateral direction or in an angular direction having a vector component parallel to the main axes.

Each set of wheels may comprise one or more wheels. The front-most set may comprise a single central wheel, whereas a rearmost set may comprise a pair of spaced coaxial wheels or vice versa. One of the sets of wheels may comprise a standard fixed axle wheel or wheels capable of rolling substantially in a single direction. In such an arrangement, preferably the front set of wheels comprises one or more fixed, non-lateral rolling wheels.

Alternatively, all of the sets of wheels may comprise multiple- or omni-directional wheels having a main wheel axis and a plurality of transversely rotatable rollers mounted on the rim of the main wheel frame.

Accordingly, the invention may further provide a handtruck comprising:

a handtruck frame including a frame base extending to a handle portion of the handtruck frame, the handtruck frame generally lying in a first plane and having a front and a rear;

a load support mounted to the front of the handtruck frame near the frame base and generally lying in a second plane inclined relative to the first plane; and a handtruck wheel assembly mounted to the rear of the handtruck frame near the frame base, wherein the handtruck wheel assembly comprises first and second sets of multidirectional wheels, each multidirectional wheel having a corresponding first or second main axis of rotation parallel to the first plane and capable of travel in a lateral direction having a vector component parallel to the first or second main axis.

Each of the wheel sets may have wheels of similar diameters. Alternatively, the front set of wheels may be larger than wheels of wheel sets to the rear thereof, for example, to negotiate rougher terrain or surfaces or over obstacles such as ridges, steps and kerbs.

Preferably, each said multidirectional wheel includes:
(a) a wheel frame including a plurality of supports;
(b) a first series of rollers radially spaced from said first or second main axis and aligned with a first plane normal to said first or second main axis, said first series of rollers spaced to form a first discontinuous rim; and
(c) a second series of rollers radially spaced from the first or second main axis and aligned with a second plane normal to said first or second main axis, said second series of rollers spaced to form a second discontinuous rim, said first and second planes aligned parallel to and spaced from one another, each said roller:
(i) rotatable about an axis normal to said first or second main axis;
(ii) mounted between a pair of said supports; and
(iii) having a lateral central cross-sectional diameter greater than the diameter of its end portions, whereby, when viewed in side elevation, the effective ground contacting surface of each said roller of said first series of rollers overlaps with the effective ground contacting surface of at least one diagonally adjacent roller of said second series of rollers so that said wheel is adapted to make effective ground contact through at least two of said rollers at any one time for effective travel in directions having a component parallel to said first or second main axis.

Each multiple directional wheel may advantageously comprise:
(a) a wheel frame including a plurality of supports;
(b) a first series of rollers radially spaced from the first or second main axis and aligned with a first plane normal to the first or second main axis, the first series of rollers spaced to form a first discontinuous rim; and
(c) a second series of rollers radially spaced from the first or second main axis and aligned with a second plane normal to the first or second main axis, the second series of rollers spaced to form a second discontinuous rim, the first and second planes aligned parallel to and spaced from one another, each roller:
(i) being rotatable about an axis normal to the first or second main axis;
(ii) being mounted between a pair of the supports; and
(iii) having a lateral central cross-sectional diameter greater than the diameter of its end portions, whereby, when viewed in side elevation, the effective ground contacting surface of each the roller of the first series of rollers overlaps with the effective ground contacting surface of at least one diagonally adjacent roller of the second series of rollers so that the wheel is adapted to make effective ground contact through at least two of the rollers at any one time for effective travel in directions having a component parallel to the first or second main axis.

Optionally, at least one of the multiple directional wheels further comprises a third or fourth series of rollers radially spaced from the first or second main axis and aligned with a third or fourth plane normal to the main axis, the third or fourth series of rollers spaced to form a third or fourth discontinuous rim, each plane aligned parallel to and spaced from each another plane in respect of the same wheel. The rollers of such a multidirectional wheel may, in side view, have the rollers evenly offset relative to rollers in other series to maximise ground contact of multiple rollers of the same wheel at any one time. Such a multiple directional wheel may be described as being a triple or quad race wheel (i.e., three or four roller races lying in parallel planes and mounted to coaxial wheel frames). Advantageously, such a triple or quad race multidirectional wheel forms the second set of the handtruck wheel assembly, although the first set of wheels may similarly comprise triple or quad race wheels. The triple or quad race wheel may be centrally positioned whereby to form a triangular arrangement when viewed in plan.

The wheels of each set of wheels having a pair of spaced wheels may be aligned with a substantially vertical plane in which outer bars of the handtruck frame lie. Alternatively, each wheel of the pair of wheels may be inset relative to the substantially vertical plane of the outer frame bars or spaced outside the line thereof where greater lateral stability is required.

The wheel assembly may comprise three or more sets of wheels aligned along three or more corresponding axles. The three or more axles may lie in substantially the same plane.

Alternatively, a third axle may lie outside the plane of the first two axles, so that the handtruck may be rocked about the middle set of wheels between two stable positions at different inclinations to the horizontal.

Because of the use of a multiple main axle wheel base, the size of the first set of wheels may be relatively small compared to typical prior art handtruck wheels. Because the front wheels may easily be lifted off the ground surface by the operator leaning down on handle means mounted at the upper free end of the frame, a small sized front and first set of wheels is not a problem in overcoming small obstructions, such as a step or a bump. However, advantageously, where the first set of wheels has a small radius, the distance between the pivot point height and the centre of mass of the load and the front and first axel is also small, so that less leverage force is required to shift the handtruck from a standing upright position to a transporting position. Optionally, each wheel of the first set has a small diameter no greater than 200 mm. Alternatively, each first set wheel has a diameter no greater than 150 mm, and in another embodiment, no greater than 130 mm.

The junction between the load support and the handtruck frame generally lies along a junction axis. The first main axis is generally parallel to the junction axis and preferably is spaced from the junction axis by the minimum distance possible. The minimum distance may be determined by particular design constraints. Firstly, it is preferable that the front wheels depend slightly below the line or plane of the lowermost edge of the load support when substantially horizontal. This enables the handtruck to be pivoted or moved sideways whilst the frame is in an upright position, for example in tight spaces. Secondly, it is preferable that the front wheels do not extend beyond the line or the first plane of the frame so that the wheels do not intersect with wide loads that extend beyond the sides of the frame. However, where wide loads are not anticipated, the front wheels may extend forward of the frame with the first axis as close as possible behind the junction axis. The latter configuration minimises the effort required to pivot the load about the first axis to transfer the handtruck from the loading position to the transport position, but is not suitable where the handtruck is used for loads wider than the frame.

The handtruck may be stable and substantially self-supporting in the transporting position when burdened with a maximum load on said load support and said handtruck frame. A maximum load is the greatest load, in terms of shape, volume and mass, that a skilled person would consider safe and manageable when using the handtruck. Optimally, the center of mass of the load should vertically fall within the wheel base or wheel base footprint when the handtruck is in the inclined transport position.

The wheel size of the wheels of the wheel assembly may be determined by a range of factors including but not limited to the following:

1. The larger the front wheel the larger the fulcrum arm length from the centre of the wheel (axle—the pivot point) to the centre of the load (under the force of gravity) when the handtruck is in a parked position. Also the larger the front wheel the higher the pivot point. This directly influences the force required to lift and pull back the load over the pivot point and into an inclined position. The larger the wheel the greater the required force/effort.
2. Secondly, and notably, a significant aspect of the self supporting handtruck is the ability to locate the centre of the load back to within the wheel base (the downwardly projected area between the foremost and rearmost wheels) created by the wheel assembly having 3 or more wheels and thus supporting the load unaided in the inclined transporting position. The larger the wheel base, the greater the variance of load combinations (dimensions and weight) that can be accommodated within a particular incline to maintain balance. The larger the wheel-base the more stable the trolley will be under various loads and terrain. The incline angle can also have a large influence on this capability for varying load types. Therefore the handtruck may include a varying/adjustable incline capability that is dependent on individual loads. This is in comparison to a simpler version that allows the frame to be fixed in 1 of 3 fixed/static positions of inclination relative to the wheel assembly.
3. It is preferable to maintain/maximise as long a wheelbase (distance between the center of the foremost front and rear wheels) as possible. However, consideration must be given to the impact of the protrusion of the wheel assembly beyond the frame footprint (to the rear) in the upright position for storage purposes. It is also preferable to maintain as minimal a distance as possible from the front wheel axle (pivot point) to the load center. Accordingly, the smaller the wheels the greater the wheel-base that can be achieved within the same overall depth (from the front of the foremost front wheel to the rear of the foremost rear wheel). Therefore, the use of as small a wheel as appropriate for the terrain/surface conditions is preferred.
4. The front and rear wheels do not necessarily need to be of the same diameter. A trade-off might be required of the wheel base and/or an extension beyond the frame footprint when in an upright position to allow for a rougher terrain/surface model with a larger front wheel. In an alternate version, a folding/collapsing wheel assembly may be incorporated to allow the wheel assembly to fold within the frame to minimise storage. This could be incorporated as part of the adjustable incline model mentioned in paragraph 2 above. A second set of wheels may also be mounted on the upper part of the frame to allow for a full flat trolley operation. In such an arrangement, an extra handle to manipulate the trolley may be required.
5. The larger the front wheel the further rearward the wheel-base is, and thus the further back the centre of the load will need to be so that it is located within the wheel-base. This has the effect that low heavy or wide loads can tend to tilt forward as the load centre cannot be tilted back at useable inclines to be within the wheel-base. A sliding and locking second load platform may be provided to enable the load to be lifted/positioned so that its centre of load will fall within the set/selected wheel-base when tilted back into the inclined position. An added advantage of an adjustable secondary load platform is that it may also to allow shorter or small loads to be positioned/elevated to a more ergonomic height for loading and unloading. It may also facilitate an ability to place loads over more fragile or lighter damageable items at the lower level or to separate such loads from each other.

The handtruck wheel assembly may further comprise a second set of multidirectional wheels having a second main axis parallel to and spaced from the first main axis. The first and second axes may lie in a third plane inclined relative to the first and second planes.

The handtruck may further include a secondary load support. The secondary load support may be positioned intermediate the length of the handtruck frame. The secondary load support may lie in a plane substantially parallel to the second plane of the primary load support. The secondary load support may be fixed, but is preferably movable. The secondary load support is preferably movable in a direction parallel to the general central longitudinal axis of the frame.

The secondary load support maybe mounted to translation means that is capable of moving the secondary load support from one position to another relative to the frame. The translation means may be motorised. The translation means may moved by hand or by a hand-driven mechanism, such as a crank, such as may be used to open hinged windows and/or a rack and pinion mechanism.

Preferably, the secondary load support is movable through a range of positions extending along at least a substantial length of the frame. The range of positions may be infinite or limited, depending on the translation means. The secondary load support may comprise a member that is L-shaped in side elevation, including a base panel and a back panel.

The mounting of the secondary load support may be hinged along or close to the top edge of the back panel. The hinge may include a rod parallel to the junction axis. The hinge may include a rod having at least one end engaged with a track extending down a side of the frame. Preferably both ends of the rod are engaged with respective spaced and parallel tracks running down either side of the frame. Accordingly, the secondary load support may be adapted to slide up and down the frame.

The secondary load support may be fixed in a desired position relative to the frame by means of a protrusion locatable in an aperture. The protrusion may extend from the rear face of the back panel and may be locatable in one of many apertures formed in a longitudinal member mounted preferably centrally on the handtruck frame.

In another aspect of the invention, there is provided a handtruck comprising:
   a handtruck frame including a frame base extending to a handle portion of the handtruck frame, the handtruck frame generally lying in a first plane and having a front and a rear;
   a load support mounted to the front of the handtruck frame near the frame base and generally lying in a second plane inclined relative to the first plane; and
   a handtruck wheel assembly mounted to the handtruck frame,
wherein:
   the handtruck wheel assembly comprises first and second sets of wheels, wherein at least one set of wheels is multidirectional, each multidirectional wheel having a main axis of rotation parallel to the first plane and capable of travel in a lateral direction having a vector component parallel to the corresponding main axis.

The handtruck wheel assembly may include a variety of different layouts. The assembly may include a pair of multi-directional wheels comprising the first set. Alternatively, the assembly may comprise a second set of multidirectional wheels. The first set may comprise a single multidirectional wheel, for example comprising two, three or more races of rollers, and the second set may comprise a pair of spaced multidirectional wheels.

Alternatively and preferably, the first set may comprise a pair of spaced multidirectional wheels including a first left multidirectional wheel on the left hand side of the handtruck and a first right multidirectional wheel on the right hand side of the handtruck. The second set may comprise a pair of spaced multidirectional wheels including a second left multidirectional wheel on the left hand side of the handtruck and a second right multidirectional wheel on the right hand side of the handtruck.

The first and second left multidirectional wheels may be aligned or not. The first set of wheels may comprise a pair of multidirectional wheels spaced at a different distance compared to the second set comprising a pair of wheels. However, preferably the first left multidirectional wheel and the second left multidirectional wheel may generally lie in a left hand vertical plane and the first right multidirectional wheel and the second right multidirectional wheel may generally lie in a right hand vertical plane.

The handtruck may have a loading or unloading position in which the load support and the first set rest in contact with the floor or ground surface. The first plane of the handtruck frame is therefore preferably aligned substantially vertically in the loading or unloading position. In this loading position, the operator may stack, for example, boxes onto the load support up to the upper portion of the frame.

Alternatively, the operator may choose to stack or unstack the load to or from the handtruck when the frame is in an inclined position (for present purposes considered the transporting position). In the transporting position, provided that the upper boxes in the stack are no heavier than the lower boxes, the handtruck may be stable and may rest entirely on the wheel assembly without support from the load support or the operator. The handtruck therefore preferably has a transporting position in which the first and second set rest in contact with the floor or ground surface. The handtruck frame preferably is inclined in the transporting position so that the load is not in danger of inadvertently shifting forward if not positively secured. In the case of low heavy or wide loads it should be noted that it may not be possible to get the load centre back within the wheel-base. Depending on the load type, it may be necessary to place enough load in the parked/upright position to ensure that it falls within the wheel-base prior to pulling it back into the inclined position and then completing the loading.

The handtruck may be stable and self-supporting in the transporting position, irrespective of the load on the load support and the handtruck frame. The handtruck wheel assembly may comprise at least three points of support (for example, corresponding to at least multiple directional wheels). The assembly may comprise one only multiple directional wheel in the front first set and a pair of spaced multiple directional wheels in the rear second set, or the arrangement may be reversed with the pair of multiple directional wheels forming part of the first set.

The wheel assembly may be adjustably mounted to the handtruck frame whereby the handtruck frame is capable of assuming two or more inclined positions having different angles of inclination to the wheel assembly in the transporting position. The actuator for the frame inclination adjustment device may be located near the handle means at the upper portion of the frame. The adjustment device may be an adjustment mechanism spring biased towards the more upright of the two or more inclined positions. The adjustment device may include a ratchet mechanism. The adjustment device may include a releasable detent adapted to travel through an arc and to engage one of a plurality of apertures to set the frame angle at a certain inclination. The adjustment device may comprise a gas, hydraulic and/or pressure assisted actuator such as a ram mechanism.

The load support may be mounted directly above the wheel assembly. The adjustment device may permit the frame to be changed from an upright orientation for loading or unloading, to an inclined orientation for locomotion. The adjustment device may allow the frame to be fully reclined creating a potential flat platform truck/trolley and/or to minimise storage space occupied by the handtruck between uses.

Multiple directional wheels suitable for use in the embodiments of the present invention will now be described, noting that, without limiting the scope of the invention to a roller race, series or wheel part with a particular range of number of rollers, multiple directional wheels having roller races with three to ten rollers, and preferably 6 or 8 rollers per race, are considered to be most usefully employed, depending on the application.

Double Wheel

Figure 2:
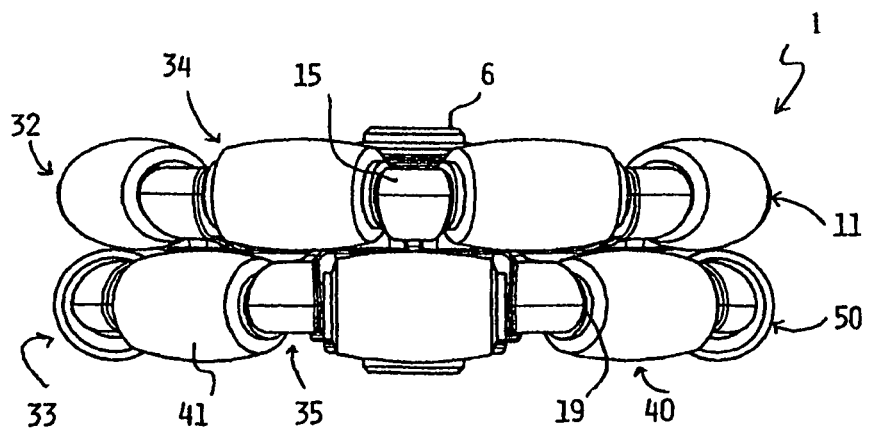
FIG. 2 is a top plan view of the wheel shown in FIG. 1.

As seen in FIGS. 1 and 2, a pair of frames 11, 50 in combination form a wheel 1, each frame 11, 50 having a series of rollers 40 regularly spaced around a rim portion 31 comprising two rims 32, 33. Each of the rims 32, 33 have a series of rollers 40 regularly spaced around the rims 32, 33. The rollers 40 are rotatable about a roller axis transverse to the main axis 6A of the main axle 6.

The rim portion 31 is spaced apart from the central hub 12 by radial arms 14. The radial arms 14 extend from the central hub 12 to the rims 32, 33 and are formed in two parallel planes to form two parallel halves corresponding to frames 11, 50 of the wheel 1.

Each of the rollers 40 as seen in side elevation is in the shape of a bi-truncated ellipse having a larger diameter in the middle than at its respective ends. Considerable overlap is provided between diagonally adjacent rollers 40 when viewed from the side elevation of the wheel 1. This is particularly important as the utility of the wheel 1 depends on good ground contact being made by the middle portion of the roller 40 when travelling in a direction transverse to the main axis 6A, particularly for the support of heavy loads.

It is seen that the rollers 40 on the two rims 32,33 in combination present a twin rim 31 having a substantially continuous circular profile. This circular rim 31 profile enables the wheel 1 to provide a smooth rotation over the ground travelling in a direction transverse to the main axis 6A and relatively smooth travel in directions parallel to the main axis 6A. Moreover, the combined effect of the circular rim 31 profile, together with the large diameter of the two rims 32, 33 and the substantial overlap between diagonally adjacent rollers 40, provides the wheel 1 with relatively smooth travelling in directions parallel to the main axis 6A. The rollers 40 are formed onto or around corresponding roller axles 16, each of which extend between ends 15 of a pair of adjacent radial arms 14. A roller tire 41 forms the external surface of the roller 40. The tire 41 may be soft and good-gripping, or strong and resilient, depending on the load application and the degree of noise that can be tolerated in a particular application. The roller tire 41 may have surface features 17, such as longitudinal or transverse grooves, ridges, treads, dimples, knobs or spiral ridges or grooves to assist in diminishing noise and/or providing better grip. The density of the tire 41 material may be increased towards its ends 42 to provide greater resilience near the overlap regions between diagonally adjacent rollers 40. Alternatively, the density of the tire 41 material close to the ends 42 may be made of a softer material to dampen noise and vibrations generated by the wheel 1.

As described in U.S. patent application Ser. No. 11/541, 459, the entire contents of which are incorporated herein by express reference, during manufacture, the two parallel parts 34,35 corresponding to rims 32,33 are formed in integral pieces by injection molding. The integral parts include the central hub portion 12, the radial arms 14 and the roller supports 16. Complementary male/female engagement means in the form of protrusions and recesses are formed in the respective hub portions 12 of frames 11,50 to secure the two parts 34,35. It is seen that the bisecting part line 36 of injection molding is through the centre of each of the parts 34,35 along a line corresponding to the general plane of each of frames 11,50 normal to the main axis 6a. The roller supports 15 are integrally molded with the radial arms 14 and the central hub 12 during the molding process whereby to separately form the frames 11,50 during the molding process. The two parts 34,35, complete with rollers 40 attached thereto, are joined by the male/female engagement means and may be glued, heat welded or ultrasonically welded together to complete the wheel 1.

Triple Wheel

Figure 3:
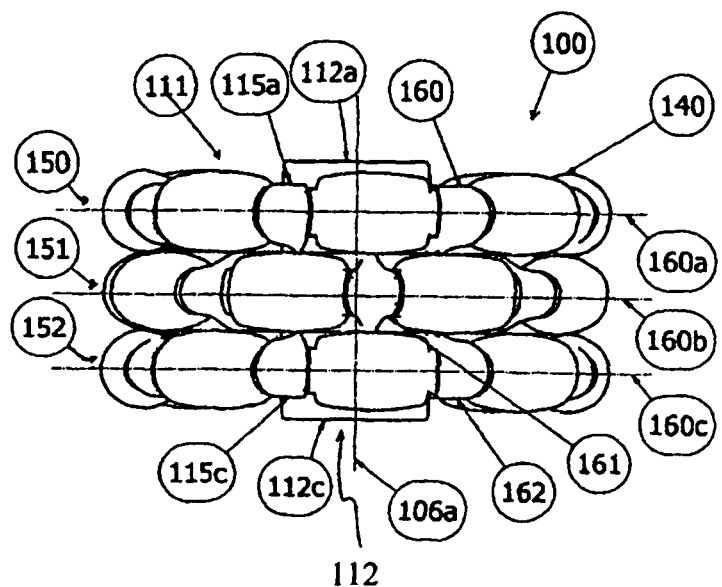
FIG. 3 is a top plan view of a wheel having three roller racers suitable for use in various embodiments of the invention.
Figure 4:
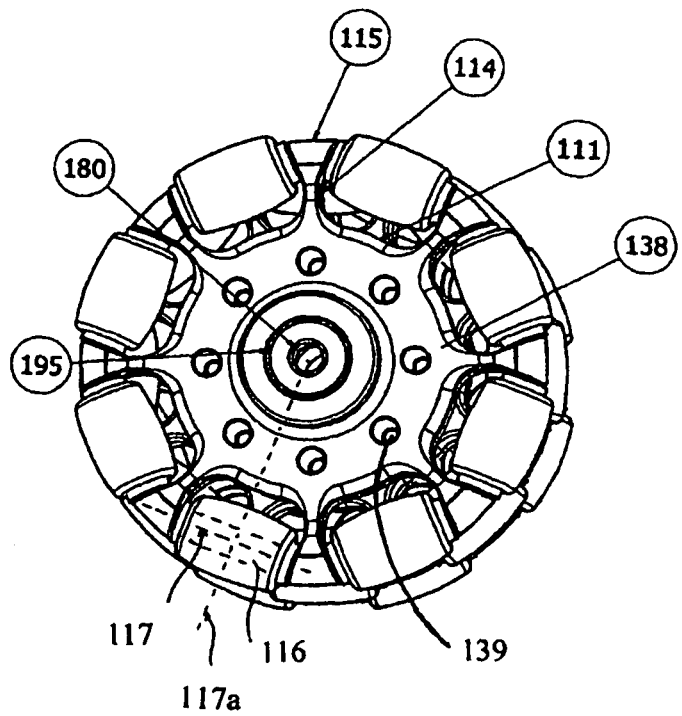
FIG. 4 is a side view of the wheel shown in FIG. 3.

In FIGS. 3 to 4 there are shown a wheel 100 comprising three rings, series or rows of rollers 140, each roller row 150, 151, 152 aligned along, respectively, three separate planes 160a,160b,160c parallel to one another and normal to a main axis 106a. Each row of rollers 150, 151, 152 is supported on a wheel frame 111. The wheel frame 111 includes a central hub 112 from which a plurality of radial arms 114 extend, the radial arms 114 each terminating in a head portion 115, the head portions 115 supporting roller axles on which the rollers 140 are rotatably mounted. The roller axles 116 of each row 150, 151, 152 lie in one of the separate planes 160a, 160b, 160c. Each roller axle 116 is aligned along a roller axis 117 normal to the main axis 106a, non-coaxial and non-parallel to its adjacent neighbouring roller axles in the same plane 160a, 160b, 160c and normal to a theoretical line 117a extending radially from the main axis 106a. Of course, the theoretical line 117a for each roller 140 is different to that of the other rollers 140 adjacent thereto in the same plane 160a, 160b, or 160c or in an adjacent one of the planes 160a, 160b, 160c.

The wheel frame 111 further includes a disc 138 co-axial with the main axis 106a and preferably integrally formed with the radial arms 114. The outer radial extent of the disc 138 is defined by a circumferential rim 139. Accordingly, the fundamental structure of the wheel frame 111 is strong and rigid due to the reinforcing achieved by the combination of central hub 112, the disc 138, the radial arms 114 and the rim 139. The wheel frame 111 may be integrally formed in a manner similar to that of the wheel frame described with reference to FIGS. 1 and 2, or as described in U.S. patent application Ser. No. 11/541,459 cross-referenced above, but preferably the wheel frame 111 is formed by the joining of discrete, separately formed wheel subframes 160, 161, 162, corresponding to roller series 150, 151, 152, respectively.

It can be seen that the head portions 115a, 115c of the outer wheel frames 160, 162 are not bi-symmetrical along their respective subframe planes 160a, 160c, but are biased away from the central series of rollers 151. This enables the wheel frame 111 to be of generally smaller and compact construction whilst making no material compromise in relation to the structural strength and integrity of the overall wheel frame 111. As previously described with reference to FIGS. 1-2, the separately formed wheel subframes 160, 161, 162 are preferably separately formed and joined together by anyone of various means, preferably ultrasonic welding. To this end, on both faces of the disc 138 of the middle subframe 161 there is provided outwardly extending studs or cylindrical protrusions (not shown) adapted to be received in complementarily shaped apertures 139. The studs and apertures 30 are arranged offset relative to one another relative to the radial arms 114 whereby to ensure the correct positioning of the rollers 140 relative to their diagonally adjacent neighbours in the adjacent series of rollers.

The central hubs 112a, 112c of the outer wheel subframes 160, 162 extend proud of the outer surface of the respective disc 138 and the central bore 180 defined by the outer central hubs 112a, 112c are plain cylindrical bores. It will be appreciated, that the entire wheel frame 111 resists twisting and torsional stresses as well as rotation about the main axis relative to the outer surface of the shaft.

Multiple Directional Wheels May have Four or More Roller Races

It will be appreciated that a fourth or even fifth row of rollers may be added to a wheel to increase stability and capacity for load bearing, depending on the particular application. In this respect, the inner rows of rollers will be supported by wheel subframes having complementary engagement means suitable to engage with the outer wheel subframes 160, 162 and or one or more inner wheel subframes. Alternatively, the inner wheel subframe may be integrally formed with varying multiple rows or series of supports on which may mounted corresponding multiple series of rollers.

Handtruck

Figure 5:
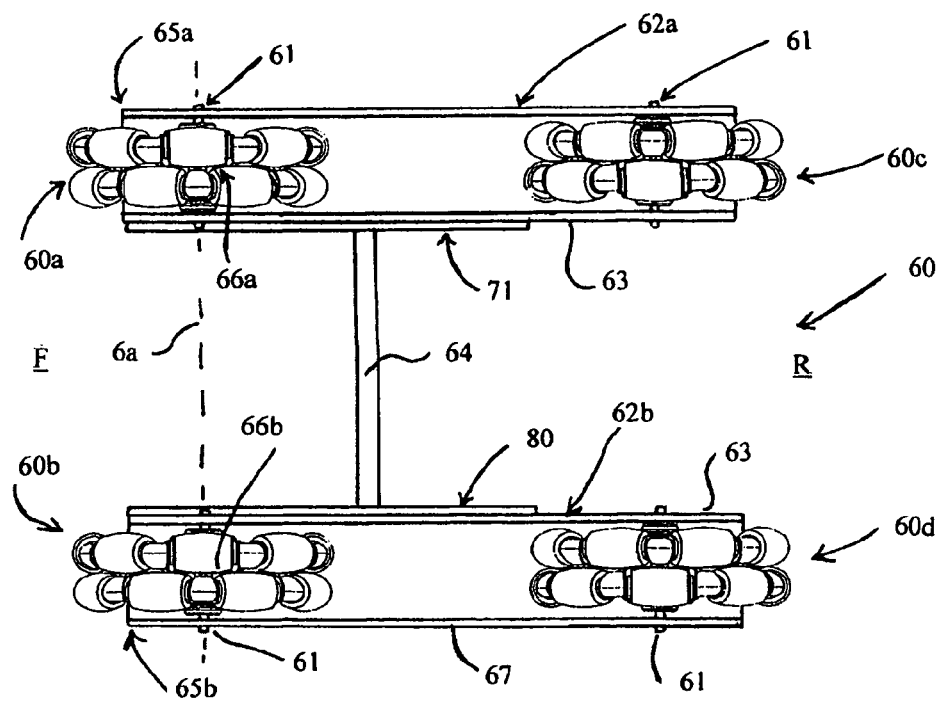
FIG. 5 is a bottom plan view of a handtruck wheel assembly according to one embodiment of the invention.

Referring to FIG. 5, there is shown a handtruck wheel assembly suitable for use in a preferred form of the invention in which the wheel assembly 60 includes two sets of wheels, namely a front pair of wheels 60a,60b and a rear set of wheels 60c,60d. Preferably, each of the wheels 60a-60d are the same type of dual roller race wheels 1 as described with reference to FIGS. 1 and 2 and may have 6 to 8 rollers per race.

However, other omni-directional wheels may usefully be substituted for the wheels 60a-60d and will perform adequately. For, example, the wheels 60a-60d may be substituted with Airtrax™'s (Chicago) omnidirectional wheels or Kornylak Corporation's Transwheel™. However, such substitute wheels preferably are capable of supporting large loads (relative to the anticipated application of the handtruck in any particular application) and enable smooth diagonal travel with low noise levels. The advantage of the preferred Rotacaster™ wheels described in U.S. patent application Ser. No. 11/541,459 is the exceptional degree of overlap achieved between diagonally adjacent rollers 40 and the strength of the wheel frame 11 and roller support combination, making such wheels 1 capable of supporting large industrial loads despite having a relatively smaller hub width and wheel diameter.

The front wheels 60a, 60b may be larger in diameter than the rear wheels 60c, 60d or may be smaller. Smaller front wheels 60a, 60b may be advantageous to reduce the distance between the load's center of mass to make the transfer from a loading to a transport position easier. Larger front wheels 60a, 60b may be advantageous to enable obstacles such as steps to be negotiated due to the larger wheel surface presented to the obstacle and ratio of the wheel size relative to the obstacle.

Each of the wheels 60a-d is rotatable about its main axis 6a by being mounted on a main axel 61 that is supported by a longitudinally aligned inverted channel bracket 62a, 62b on either side of the wheel assembly 60. The channel brackets 62a-b are preferably coextensive both forward (see reference letter F) and aft (see reference letter R), are aligned parallel and are spaced relative to one another by a spacing strut 64. Spacing strut 64 is not essential but may be used to strengthen the wheel assembly 60 and to anchor same against moving/rolling rearward as the load is pulled back or lowered forward into the parked position. The strut 64 may provide a foot rest or stop that the operator can use to stabilize the handtruck against rolling movement. However, due to the nature of the multidirectional wheels 1, other wheel assembly arrangements are possible that may perform adequately as well. For example, the wheel plan may vary in the number of wheels (as will be described below with reference to FIG. 6), and/or the wheels 60a-d may be aligned in a converging or diverging plan front F to rear R. The channel brackets 62a-b may therefore converge towards the rear R where rearmost stability under heavy loads is not critical in the transport position in a particular application. Or they may diverge where floor level width or span dimensions of the wheel assembly are not critical with regard to space to manoeuvre in a particular application. In the embodiment shown in FIG. 5, it is considered that a rectangular wheel plan will suit most applications by providing both fore F and aft R stability. The spacing of the inline wheels (where 4 wheels are used) is important in allowing the front set of wheels to safely/effectively land on and clear the edge of a step/kerb. To further assist with clearance of obstacles, a cut away arc on the lower edges of the channel brackets 62a, 62b (where used) between the inline wheels is provided so that the lower edges of the channel brackets 62a, 62b do not scrape against the obstacle as it is traversed.

The inverted channel brackets 62a, 62b may therefore, in practice, take many forms, provided that they provide the requisite support for the axels 61. For example, the brackets 62a, 62b may simply each comprise a single metal panel from which extend rigidly mounted stub axels corresponding to the axels 61. Accordingly, the support of the axels 61 at both ends thereof is a preferment and is not essential to the performance of the invention at its most simple level. The channel brackets 62a-b may be substituted with a chassis or some other wheel assembly frame or body to provide the wheel assembly structure and axel 61 support, for example as described below with reference to FIG. 16.

The wheel assembly may be made from metal, polymeric or other materials, provided that they possess the necessary performance properties for any particular application. For heavy load lifting and carrying applications, the brackets 62a, 62b, 71 and the spacing strut 64 are preferably made from metal, such as steel, painted or otherwise surface protected to prevent corrosion with regard to the particular environment in which it is to operate. For lighter industrial, commercial or domestic applications, aluminium, polymers, polymeric carbon fibre or other materials may used for a combination of strength and light weight.

In the embodiment shown in FIG. 5, dual wheels 60a, 60c occupy substantially the same general vertical plane extending Front F to Rear R and the wheels 60b and 60d substantially occupy the same general vertical plane extending Front F to Rear R. The wheels 60a and 60b are mounted in coaxial relationship, as are wheels 60c, 60d relative to one another. Accordingly, the four wheels 60a-60d provide essentially four general zones or points of ground contact for the wheel assembly 60.

The left hand side of the wheel assembly includes the inverted channel bracket 62a to which are mounted wheels 60a and 60c in series. The inverted channel bracket 62b on the right hand side of the wheel assembly 60 provides mounted support for wheels 60b, 60d in series. Extending between the inside walls 63 of the inverted channel brackets 62a, 62b is the stabilizing spacing strut 64 that serves to space the brackets 62a, 62b from each other.

The front wheels 60a, 60b are mounted on the brackets 62a, 62b at such positions that there front most portions extend clear of the front end 65a, 65b of the brackets 62a, 62b and the lower most portions 66a, 66b of the wheels 60a, 60b extend lower than the lower most edge 67 of the brackets 62a, 62b. Therefore the wheels 60a, 60b are clear to engage and contact upcoming obstacles and/or irregularities in ground/floor surfaces and ride up and over same, rather than allow the leading edges 65a, 65b of the brackets 62a, 62b to abut against such obstacles and be obstructed. Similarly, the rear most wheels 60c, 60d extend rearwardly and downwardly clear of the brackets 62a, 62b to facilitate reversing over such obstacles. In practice and in any case, the relatively small front wheels 60a, 60b may be lifted off the ground/floor surfaces as will be described below.

The spacing strut 64 may be directly welded or otherwise fastened at either end to frame mounting brackets 71 that are in turn welded or otherwise fastened to the internal wall 63 of each inverted channel bracket 62a, 62b.

Figure 6:
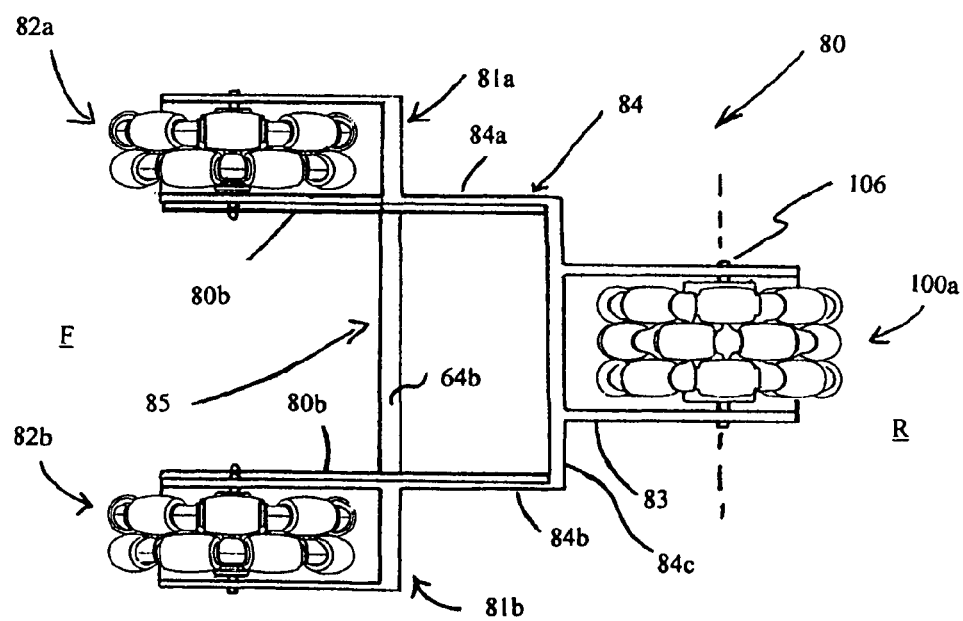
FIG. 6 is a bottom elevation of a handtruck wheel assembly according to another embodiment of the invention.

An alternative wheel assembly is shown in FIG. 6 in which the wheel assembly comprises a wheel frame 90 having leading individual channel sections 81a, 81b to which are mounted front dual race wheels 82a, 82b in line with the description of the dual race wheel 1 shown in FIGS. 1 and 2. A rear triple wheel 100a is mounted on a rear inverted channel bracket 83 about a rear main axle 106. The rear inverted channel bracket 83 extends from an intermediate section 84 having side arms 84a, 84b and a cross beam 84c to which the rear inverted channel bracket 83 is directly attached, welded, cast or integrally formed therewith.

The intermediate section 84 may be dispensed with if a short wheel base is preferred for the wheel assembly 80, in which case the cross beam 84c may be welded, attached or integrally formed with the rearmost end of the front brackets 81a, 81b. In any case, it will be appreciated by the skilled person that the wheel assembly 80 may comprise a variety of frame designs in supporting mounted wheels 82a, 82b, 100a in a three zone or point ground contact wheel arrangement. The word "zone" may be understood to mean the contact made by a single wheel 1, 100a, whether contact with the floor/ground involves contact at one point by a single roller 40,140, at two points by two diagonally adjacent rollers 40,140, at three points by three rollers 40,140 (two in series, one diagonally adjacent), four points by four closely positioned rollers 140 (a central pair in series and two side rollers 140 diagonally adjacent), or five points by five closely positioned rollers 140 (two side pairs in series and a central roller 140 diagonally adjacent and centrally located relative to the two side pairs).

By providing a triple race wheel 100a, rather than a dual race wheel 1 at the rear end of the three wheel assembly arrangement 80, the triple wheel 100a improves the lateral stability of the wheel assembly 80, even if the front wheels 82a, 82b are lifted off the ground/floor surface to overcome an obstacle whereby the rear triple wheel 100a is the sole means of support of the wheel assembly 80. However, the skilled person will appreciate that a dual wheel 1 may perform adequately as a rear single wheel in the three wheel assembly arrangement 80 in place of the triple race wheel 100a, particularly in applications where the rear wheel 100a is unlikely to be used the sole means of support or light loads are envisaged.

The three wheel assembly 80 may also be used in reverse orientation by providing the single triple race wheel 100a at the front F whereby front lateral arms (not shown) attach the wheel assembly 80 to the handtruck frame 91 (described with reference to FIGS. 7 and 8).

Furthermore, the skilled person will appreciate that various combinations of multi directional wheels 1,100 may be provided using a variety of different wheel plans having ground engaging zones or points numbering 3 or greater, with the three wheel 80 and four wheel 60 arrangements being preferred. Moreover, the two race wheels 1 may be substituted for the triple wheel multi directional wheels 100, or vice versa, depending on the anticipated load of any particular application. Moreover, the three wheel assembly arrangement 80 may be provided in reverse direction in which the triple wheel 100a is front most and the dual wheels 82a, 82b mounted rear most on the wheel assembly 80. Where high loads are anticipated, pairs of dual race or triple race wheels 1,100 may be used in single zones if the wheel assembly to provide strengthened support and load bearing capacity.

The three wheel assembly 80 frame 85 is mounted to the handtruck frame 91 by means of the frame mounting bracket 80b which each extend from the front most portion of the front inverted channel brackets 81a, 81b to the cross beam 84c. The spacing strut 64b extending between the frame mounting brackets 80b may or may not be required, depending on the required strength of the three wheel assembly frame 85 in any particular application.

Figure 7:
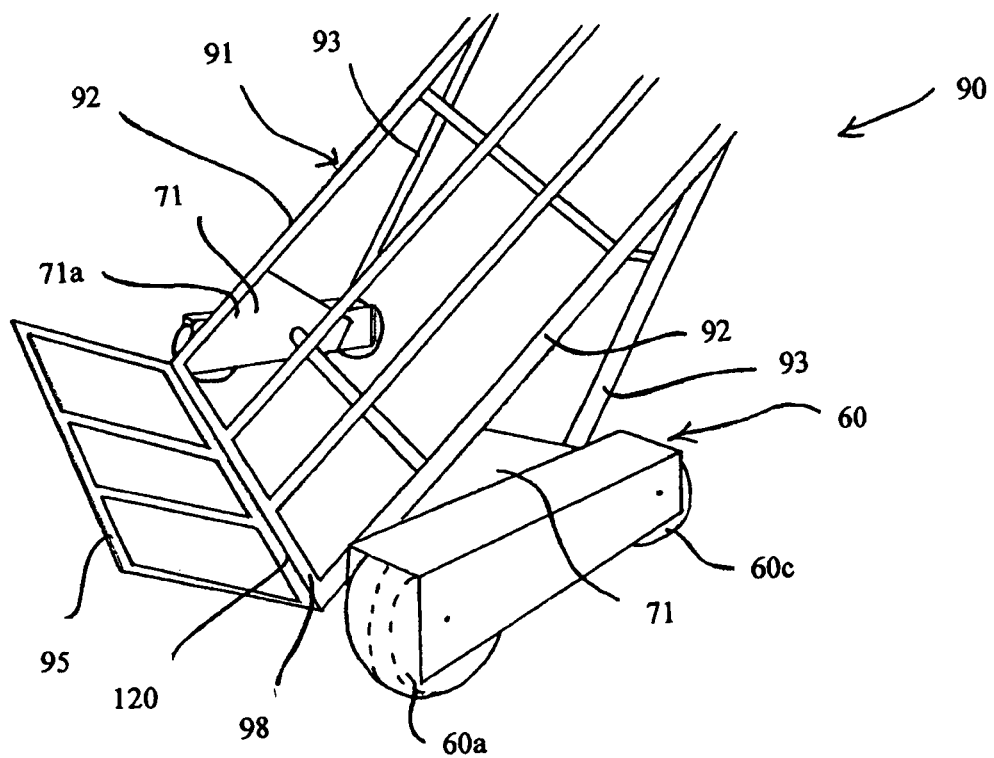
FIG. 7 is a perspective view of a handtruck according to the embodiment shown in FIG. 5.

Turning to FIG. 7, there is shown a handtruck 90 comprising a four wheel assembly 60 having a pair of frame mounting brackets 71 to which is mounted a generally upright handtruck frame 91 and generally horizontal load support 95.

The generally upright frame 91 is attached to the frame mounting brackets 71 by, preferably, welding along its upper edge 71a to the lower most portions of side rails 92 of the substantially upright frame 91 and by angled struts 93 attaching to the rear most portion of the frame mounting bracket 71.

Figure 9:
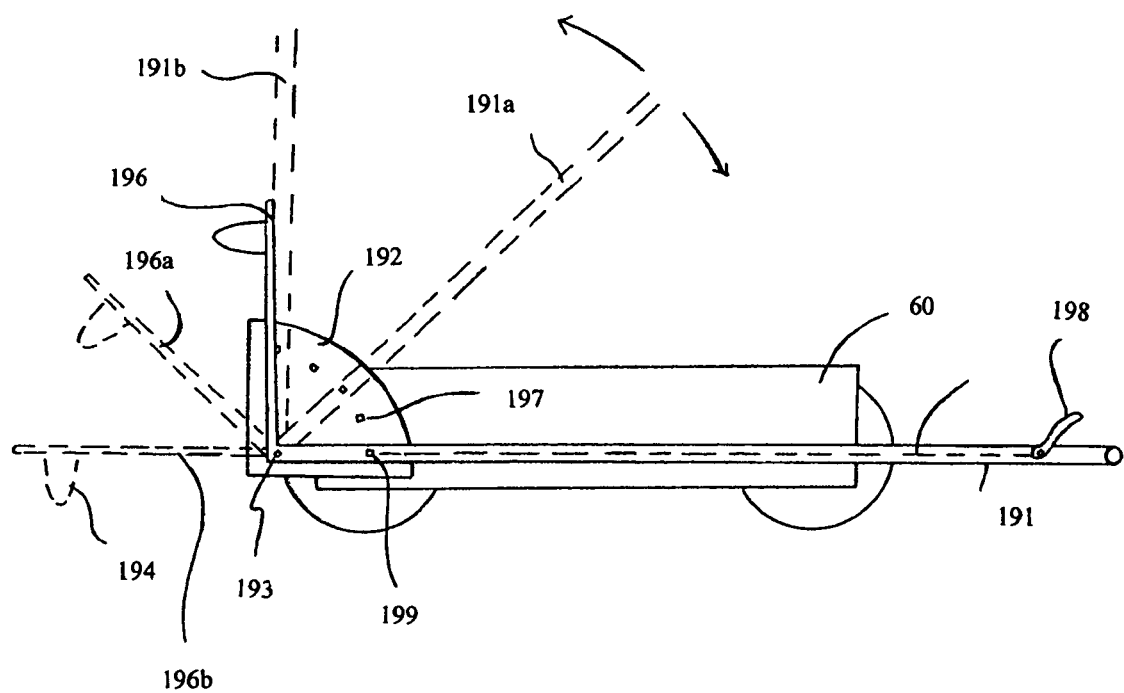
FIG. 9 is a schematic side plan view of a handtruck wheel assembly according to another embodiment of the invention.

An alternative embodiment is shown in FIG. 9. A substantially upright frame 191 may be adjustably mounted to frame mounting brackets 192 mounted to the internal wall 63. With this arrangement the angle of inclination of the frame 191 may be varied relative to the wheel assembly 60, 80. By adjusting the angle of inclination of the frame 191, accommodation of persons of different height and adjustment to different loads and transport requirements can be made. Moreover, the frame 191 may be laid substantially flat relative to the wheel assembly for storage or transport to and from jobs, etc. The frame 191a may be set at an intermediate inclined position, as shown in broken lines in FIG. 9 at, for example, a 45° angle, the frame 191 may be laid flat as shown in solid lines, or the frame 191b shown also in broken lines may be adjustably secured in a substantially upright position. In such an upright position, depending on the height of the pivot axis 193 about which the frame 191 rotates, it may be necessary to include a stand 194 downwardly depending from the load support 196,196a,196b and adapted to engage the ground surface when the frame 191b is in the substantially upright position. The adjustment means comprises a releasable detent arrangement in which the frame mounting brackets 192 include an arc of square apertures 197. The frame includes a corresponding retractable detent (not shown) that is remotely controlled by a lever 198 connected by cable or rod to the retractable detent mechanism 199. Actuation of the lever retracts the detent from an aperture 197 and allows the frame 191 to be moved to another angled setting in which the detent locks in to another one of the apertures 197. The person skilled in the art will appreciate that other adjustment mechanisms can be usefully deployed to lock the frame 191 in alternative positions of inclination. For example, a ratchet mechanism might be used as a releasable adjustment means or a fixed lug protruding from the frame 191 may be deflectable and releasable by being able to flex a rail of the frame on which the lug is mounted. Alternatively, a hydraulic or gas ram may be used to assist in setting the incline angle without balancing the load.

The frame 91 comprises an upper end 96 having handle means 97 and a lower rail 98 to which the load support 95 may be attached, for example by welding. Preferably, the frame adjustment means is controlled via an actuator located near the handle means 97.

Figure 8:
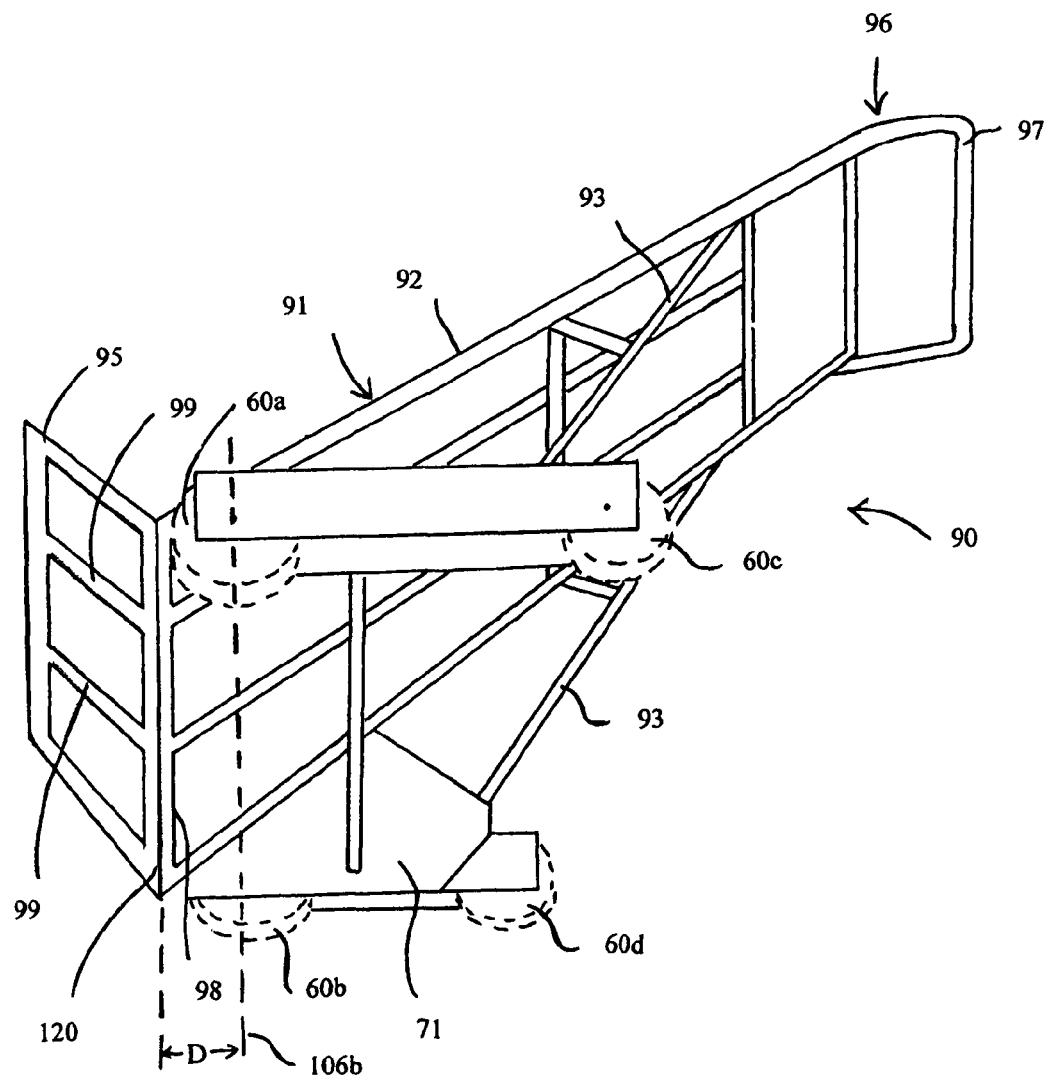
FIG. 8 is a lower perspective view of the handtruck shown in FIG. 7.

The frame 91 may be provided in a variety of forms other than those expressly shown in FIGS. 7-9. For example, the frame 91 may remain stationary and provide backing support for the load, whereas the handle may be a separate component and optionally separately adjustable component. For example, the handle section may be a T-shaped member with the cross bar forming the handle component. The T-shaped member may be adjustable with regard to the inclination relative to the wheel assembly 60,80. Alternatively, the handle portion may be U- or P-shaped or may have two wing handles, etc.

The load support 95 may, in its simplest form, comprise a pair of forks, or may comprise a solid substantially horizontal plate. In the embodiment 90 shown in FIGS. 7 and 8, the load support 95 comprises a planar rectangular frame including a pair of space-filling, reinforcing struts 99 to strengthen the load support frame and allow accommodation of smaller dimensioned load items.

According to the handtruck embodiment 90 shown in FIGS. 7 and 8, or an embodiment incorporating the wheel assembly 80 shown in FIG. 6, it will be appreciated that the front wheels 65a, 60b, 82a, 82b may be generally small in diameter relative to equivalent prior art front handtruck wheels and the rear wheels 60c,60d,100a. However, it will also be appreciated that relatively large diameter front wheels 65a, 60b, 82a, 82b may also be used depending on the requirements of particular applications. Furthermore, the rear most wheels 60c, 60d, 100a may be of the same diameter as the front wheels, so that the same or similar dimensioned wheels may be used, manufactured and interchanged between the front and back, thereby simplifying production of the handtrucks and minimising costs by reducing the total number of different components.

In terms of operation, the skilled person will appreciate that where the handtruck 90 is pushed up to a front-facing obstruction, such as a bump or step, downward pressure on the handle 97 will enable the front wheels 60a, 60b, 82a, 82b to be lifted off the ground/floor surface to clear the obstruction. In equivalent prior art arrangements, large front wheels have been provided with large diameters, so that the front wheels were adapted to ride up and over such bumps. Whilst the use of a large front wheel or wheels, optionally multiple directional, is within the scope of this invention, the present invention does not have the problems associated with the incorporation of swivel casters employed in prior art handtrucks. In prior art handtrucks, rear swivel casters or fixed wheels have been used. In the case of swivel casters, it is difficult and unsafe and/or potentially damaging to lever off these wheels. In the case of standard fixed wheels this operation can be achieved but the other functionality of lateral moveability is not present nor is turning possible when more than two wheels are in contact with the ground.

With further reference to the small diameter of the front wheels 60a, 60b, 82a, 82b, it will be seen that a small distance is achievable between the junction 120 and the front main axis 106b. The small distance D and height differential between the junction 120 and the front main axis 106b provides several advantages:
1. The load support 95 may still be laid horizontally flat on the ground/floor surface whilst still being supported rearwardly by the front wheels 60a, 60b, 82a, 82b;
2. The small distance D means that only a small leverage force is required to be applied by the operator downwardly on the handle 97 to lift the load support 95 from the horizontal, flat position off the ground/floor surface so that the rear wheels 60c, 60d, 100a may be lowered into ground/floor surface contact for transport. The arrangement is advantageous for loading and/or to manoeuvre the load slightly or to rotate it in a confined space without requiring a large cantilevered force. In addition, the multi-directional wheels not only allow the load platform or support to be rolled directly forward or back under a load, but also laterally without the need for a 3-point turn manoeuvre. This also applies to unloading productivity for tight stacking and storage or confined space work;
3. The wheel assembly 60, 80 may be placed horizontally on the ground/floor surface, so that the inverted brackets 62a, 62b or the frame 85 are substantially horizontal for even distribution of the load through all three, four or more wheels 1, 100. The load can be fully supported requiring minimum effort from the operator. It also allows the operator to push or manoeuvre the trolley from different positions, e.g., from the side for lateral movement or in confined space or openings such as through a self closing door. As previously stated the handtruck can be manoeuvred in a substantially upright position using a foot on the strut 64 requiring minimal pull back or balancing force. The handtruck of the invention can even be manoeuvred from the side if the handtruck. Optionally, a simple floor lock type brake is provided to stop the handtruck from rolling in the transport/inclined position or for parking in this mode. The handtruck tends to track well. Tracking is the tendency of the handtruck to follow a primary line of direction. This may be due to the fixed orientation of the primary axis. The assembly therefore provides good tracking compared to prior art swivel caster handtrucks, including a level of control on trafficable inclines;
4. Particularly advantageously, the inventive arrangement 60, 80 provide multiple directional wheels on the front of the wheel assembly 60, 80 to enable lateral or sideways movement of the handtruck 90, as well as a capacity to rotate about a vertical axis. When negotiating tight spaces in a warehouse or office environment, moving a load across a stairwell landing, manoeuvring through a self closing door or other narrow or curved access passage, or in an elevator, such sideways or lateral movement capacity may be critical, may spare the operator considerable effort and may substantially contribute to the health and safety of the operator and those around him/her. Another embodiment provides a vertical load support (in which the load items rest against the backing of the vertical load support) and a horizontal load platform. The platform may sit slightly back relative to the frame and between the front wheels or over the front wheel. This arrangement is advantageous for narrow loads or loads requiring maximum stability, e.g., gas cylinders or heavy low loads etc. This arrangement ensures that the load center will always sit within the wheel base and/or that the load can wholly or predominantly be positioned within the wheel base, thereby minimising any potential for overturning in the forward or rearward direction.

The main advantage of the handtruck of the present invention is that it supports the load in a balanced, inclined position whilst providing key advantages such as:
1. It takes the balancing and load supporting effort and force required off the user;
2. It enables multidirectional steering on 3 or more fixed wheels;
3. Purely lateral/sideways movement is possible when all multidirectional wheels are in ground contact;
4. Can be pivoted/levered off the fixed rear wheels to raise the front to step over an obstruction or up a kerb;

5. Can use the vertical frame as a lever to lift the load up a step, thereby reducing the required effort an offering an ergonomically better lifting position; and/or
6. Reducing the pull back effort required for a load relative to the front wheel diameter and position.

Figure 10:
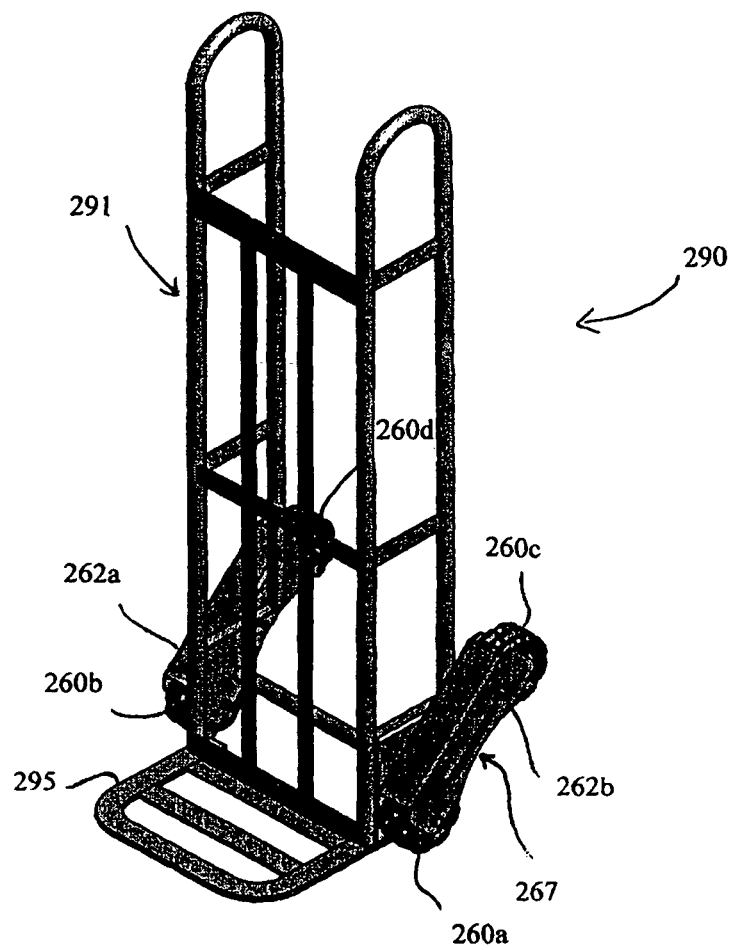
FIG. 10 is a perspective view of a handtruck similar to the embodiment shown in FIG. 5.

FIG. 10 is a perspective view of a handtruck similar to the embodiment shown in FIG. 5 with the exception that the inverted channel brackets do not have a linear lower most edge 67 as in the embodiment shown in FIG. 5. In contrast, the lower most edges 267 intermediate the in line wheels 260a, 260c on the one side and the wheels 260b, 260d on the other side are recessed with a shallow arc to enable the inverted channel bracket 262a, 262b to more easily clear obstacles. The concave or curved shape of the lower edges 267 of the channels 262a, 262b facilitates clearance of the channels 262a, 262b as the handtruck 290 is manoeuvred over, up or down an obstacle such as a step or kerb.

Referring to FIGS. 11A-11C, the angle of inclination of the wheel base comprising channels 262a, 262b and the wheels 260a-d is adjustable or may be provided in various fixed positions relative to the substantially upright frame 291. The angles of inclination of the wheel base 260 may vary through a range of 20-70 degrees and variations of 45, 40 and 35 degrees respectively of the wheel base relative to the load support 295 are shown in the drawings. The wheel base 260 is either permanently fixed by welding or fastening means, such as bolts at a predetermined angle of inclination by permanent attachment to the frame mounting brackets 271. Alternatively, the wheel base 260 may be adjustable on the same handtruck unit 290 whereby the angle of inclination of the wheel base 260 may be varied in a manner similar to that described with reference to the embodiment shown in FIG. 9. Furthermore, the adjustment of the wheel base 260 may be achieved by various driven means, such as an electrical servo motor, or hydraulic or air rams. Preferably, the wheel base 260 is manually adjustable to a certain angle of inclination relative to the frame 291.

As shown in FIG. 11A, the angle of inclination of the wheel base 260 relative to the frame 291 may be smaller for smaller loads so that the centre of mass 296a is positioned over the wheel base 260 when all four wheels 260a-d are placed on level ground. In FIG. 11A, the axis of the centre of gravity 297a is shown when the frame 291 is vertical and the axis of the centre of gravity 298a is shown where the four wheels 260a-d are resting on level ground. As can be seen in FIGS. 11B and 11C, as the height of the load 295b, 295c increases, the centre of gravity 296b, 296c is located higher relative to the load support 295. It can be seen that there is an advantage where the centre of gravity of the load is higher in providing that the angle between the wheelbase 260 and frame 291 is higher. It assists in safety and manoeuvrability to have the centre of gravity 296b, 296c fall within the footprint of the wheelbase 260 when all four wheels are resting on level ground in the transport position of the handtruck 290.

Figure 14:
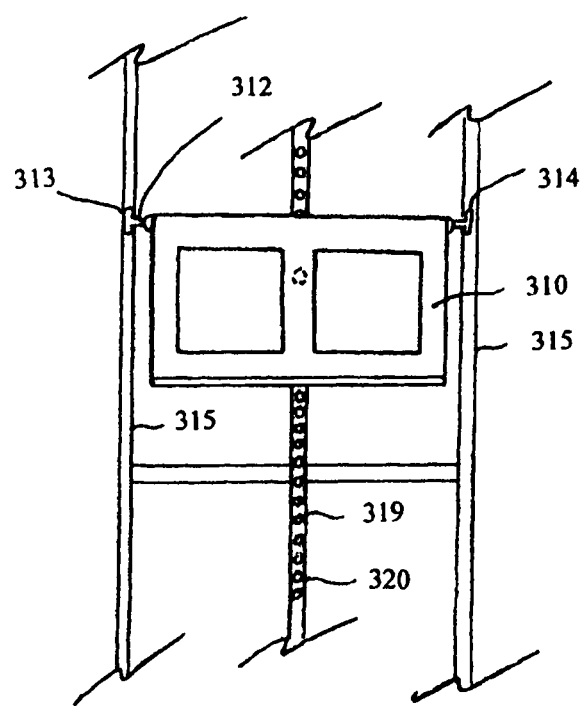
FIG. 14 is a schematic front view of a mid portion of the handtruck according to the embodiment shown in FIG. 12.

Turning to FIGS. 12-14, there is shown a handtruck 390 that is similar to the embodiment shown in FIG. 10 with the exception that a secondary load support 310 is also provided. The secondary load support 310 includes a primary load support or platform 395 in fixed position at the base of the frame 391. The secondary load support 310 is adjustable whereby to vary its vertical position up and down a substantial length of the frame 391. There are advantages in being able to set a load higher on the frame 391. Having a higher loading base can reduce back strain of an operator. Furthermore, a higher centre of gravity of the load may be desirable where the angle of inclination of the wheel base is low relative to the load support 395.

In one embodiment, the secondary load support 310 is moved by a rack and pinion mechanism. The drive mechanism for the rack and pinion mechanism may be a hand crank or may be motorised by means of an electric servo motor. In another embodiment, the secondary load support 310 is mounted on to a continuous chain or belt that extends between upper and lower pulley or toothed members controlled by a handcrank and brake, or by a servo motor.

In the example shown, the upper most edge of the secondary load support 310 is suspended on a hinge 311 comprising a laterally extending rod 312 terminating in a pair of end trapped lugs 313, 314 that are adapted to travel up and down a pair of opposed side rails 315 forming the side legs of the frame 391. The side rails 315 may alternatively be circular or any other suitable shape in transverse section, provided that the transverse section of the side rails 315 is consistent throughout the length along which the lugs 313, 314 travel. To fix the secondary load support 310 at any particular vertical or upright position, there is provided a protrusion 318 adapted to be located in any one of a number of apertures 319 located in a longitudinally aligned post, strap or rod 320 located intermediate and parallel with the side rails 315.

As shown in FIG. 12, the secondary load support 310 may be lifted upwards so that the backing member 321 rotates away from the longitudinal strap 320 so that the protrusion 318 is pulled out of engagement with an aperture 319. The secondary load support 310 may then be moved up or down the rails 315 whereby to locate the secondary load support 310 at a different height and secured at that height by allowing the backing member 321 to fall back towards the strap under the influence of gravity. The height of the secondary load support 310 may be thus adjusted so that the protrusion 318 may correspond with and engage an aperture 319. In use, it will be appreciated that a load on the secondary load support 310 will ensure that the protrusion 318 is retained within the aperture 319. In this regard, the protrusion 318 may be a tight fit in each aperture 319 so that the secondary load support 310 does not easily bounce out of engagement with the longitudinal strap 320. It will be appreciated by the skilled person that the protrusion 318 must have a strong connection with the backing member 321 as it predominantly bears the weight of the load on the secondary load support 310.

Figure 15:
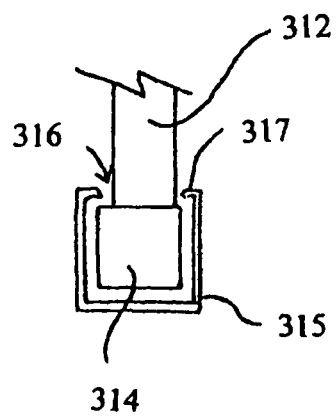
FIG. 15 is a schematic sectional top plan view of a side rail according to the embodiment of FIG. 12.

In FIG. 15, one rail 315 is partially shown. The lug 314 is trapped within and travels along the length of the rail 315.

Figure 16:
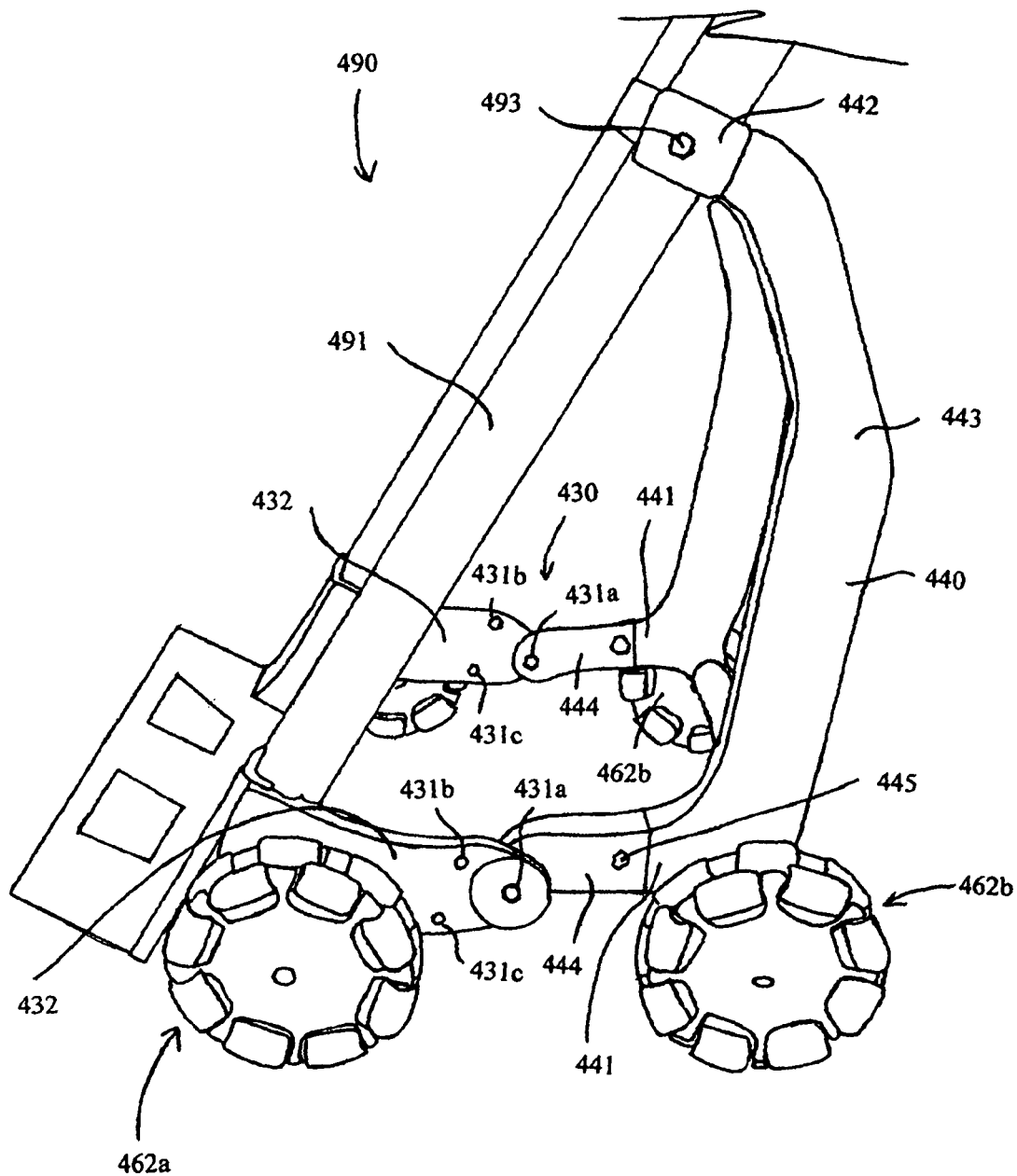
FIG. 16 is a schematic perspective view of a handtruck according to another embodiment of the invention.

Referring to FIG. 16, there is shown a handtruck 490 in which the wheelbase 430 is formed by a collapsible frame 440 and has three alternative settings represented by apertures 431a, b, c on a rearwardly extending first pair of arms 432 fixedly mounted to the base of upright frame members 491. The three apertures 431a-c enable the rear set of wheels 462b to be set at three different positions relative to the frame 491 and also allows the angle of inclination of the plane in which the wheelbase 430 lies to be varied relative to the frame 491. To accommodate the different positions that rear arms 441 are fixed relative to the front arms 432, the mounting brackets 442 adapted to clamp the vertical arms 443 of the rear frame 440 to the side rails 492 of the front frame 491 are slideably adjustable up and down the rails 491 and may be fixed in position by grub screws 493 or bolts as appropriate. Similarly, the rear arms 441 are telescopically adjustable by means of sleeves 444 that are securable at different points along the length of the rear arms 441 by grub screws or bolt and nut means 445.

Depending on the application, it may be advantageous to have additional tracking ability through the use of normal, non-swiveling, non-multiple directional wheels. Accordingly, the handtrucks 90, 190, 290, 390, 490 may comprise one set of front or rear multiple directional wheels, with the other set comprising fixed axis tracking wheels with no lateral rolling capability. In particular, advantageously the front wheels may be standard fixed axis wheels that may be larger or smaller than the rear wheels.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the handle means uppermost.

It will be appreciated by those skilled in the art that many modifications and variations may be made to the methods of the invention described herein without departing from the spirit and scope of the invention.

What is claimed is:

1. A handtruck comprising:
a handtruck frame including a frame base extending to a handle portion of the handtruck frame, the handtruck frame generally lying in a first plane and having a front and a rear;
a load support mounted to the front of the handtruck frame and generally lying in a second plane inclined relative to the first plane; and
a handtruck wheel assembly mounted to the frame base, the handtruck wheel assembly comprising at least two sets of wheels, each set having a fixed main axis of rotation parallel to the first plane and capable of travel in a primary direction normal to the main axis, wherein the wheel or wheels of at least one of the sets of wheels is or are multidirectional and capable of travel in a lateral direction or in an angular direction having a vector component parallel to the main axis, and wherein the multidirectional wheels tend to track in the primary direction, wherein the handtruck wheel assembly comprises first and second sets of multidirectional wheels, each multidirectional wheel having a corresponding first or second main axis of rotation parallel to the first plane and capable of travel in a lateral direction having a vector component parallel to the first or second main axis.

2. A handtruck according to claim 1, wherein said first and second axes lie in a third plane inclined relative to said first and second planes.

3. A handtruck according to claim 1, wherein each multidirectional wheel of said second set has a smaller diameter compared to each multidirectional wheel of said first set.

4. A handtruck according to claim 1, wherein each multidirectional wheel of said second set has the same diameter as each multidirectional wheel of said first set.

5. A handtruck according to claim 1, wherein said first set comprises a pair of spaced multidirectional wheels including a first left multidirectional wheel on the left hand side of said handtruck and a first right multidirectional wheel on the right hand side of said handtruck.

6. A handtruck according to claim 5, wherein said second set comprises a pair of spaced multidirectional wheels including a second left multidirectional wheel on the left hand side of said handtruck and a second right multidirectional wheel on the right hand side of said handtruck.

7. A handtruck according to claim 6, wherein said first left multidirectional wheel and said second left multidirectional wheel generally lie in a left hand plane and said first right multidirectional wheel and said second right multidirectional wheel generally lie in a right hand plane.

8. A handtruck according to claim 1, wherein said handtruck has a loading or unloading position in which said load support and said first set of wheels rest in contact with the floor or ground surface.

9. A handtruck according to claim 1, wherein said handtruck has a loading or unloading position and wherein said first plane of said handtruck frame is aligned in an inclined position to the horizontal in said loading and unloading position to avoid the need to pull back heavy loads to the transporting position.

10. A handtruck according to claim 8, wherein said first plane of said handtruck frame is aligned substantially vertically in said loading or unloading position.

11. A handtruck according to claim 1, wherein said handtruck has a transporting position in which said first and second sets of wheels rest in contact with the floor or ground surface.

12. A handtruck according to claim 11, wherein said handtruck frame is inclined in said transporting position.

13. A handtruck according to claim 12, wherein said handtruck is stable and substantially self-supporting in said transporting position when burdened with a maximum load on said load support and said handtruck frame.

14. A handtruck comprising:
a handtruck frame including a frame base extending to a handle portion of the handtruck frame, the handtruck frame generally lying in a first plane and having a front and a rear;
a load support mounted to the front of the handtruck frame and generally lying in a second plane inclined relative to the first plane; and
a handtruck wheel assembly mounted to the frame base, the handtruck wheel assembly comprising at least two sets of wheels, each set having a fixed main axis of rotation parallel to the first plane and capable of travel in a primary direction normal to the main axis, wherein the wheel or wheels of at least one of the sets of wheels is or are multidirectional and capable of travel in a lateral direction or in an angular direction having a vector component parallel to the main axis, and wherein the multidirectional wheels tend to track in the primary direction, wherein each said multidirectional wheel comprises:
(a) a wheel frame including a plurality of supports;
(b) a first series of rollers radially spaced from said main axis and aligned with a first wheel plane normal to said main axis, said first series of rollers spaced to form a first discontinuous rim; and
(c) a second series of rollers radially spaced from the main axis and aligned with a second wheel plane normal to said main axis, said second series of rollers spaced to form a second discontinuous rim, said first and second planes aligned parallel to and spaced from one another, each said roller:
(i) rotatable about an axis normal to said main axis;
(ii) mounted between a pair of said supports; and
(iii) having a lateral central cross-sectional diameter greater than the diameter of its end portions,
whereby, when viewed in side elevation, the effective ground contacting surface of each said roller of said first series of rollers overlaps with the effective ground contacting surface of at least one diagonally adjacent roller of said second series of rollers so that said wheel is adapted to make effective ground contact through at least two of said rollers at any one time for effective travel in directions having a component parallel to said main axis.

15. A handtruck according to claim 14, wherein at least one of said multiple wheels further comprises a third series of rollers radially spaced from the main axis and aligned with a third plane normal to said main axis, said third series of rollers spaced to form a third discontinuous rim, said first, second and third planes aligned parallel to and spaced from one another.

16. A handtruck according to claim 1, wherein said wheel assembly is adjustably mounted to said handtruck frame whereby said handtruck frame is capable of assuming two or more inclined positions having different angles of inclination to said wheel assembly in said transporting position.

17. A handtruck according to claim 16, wherein said handtruck frame includes an adjustment mechanism spring biased towards the more upright of the two or more inclined positions.

18. A handtruck according to claim 1, wherein said handtruck frame further includes a secondary load support positioned intermediate the length of the handtruck frame, said secondary load support movable in a direction parallel to the general central longitudinal axis of the frame.

19. A handtruck comprising:
a handtruck frame including a frame base extending to a handle portion of the handtruck frame, the handtruck frame generally lying in a first plane and having a front and a rear;
a load support mounted to the front of the handtruck frame and generally lying in a second plane inclined relative to the first plane; and
a handtruck wheel assembly mounted to the frame base and extending from the frame base at a fixed, acute angle to the first plane, the handtruck wheel assembly comprising at least two sets of wheels coupled to the frame base, each set having a fixed main axis of rotation parallel to the first plane and capable of travel in a direction normal to the main axis, wherein at least one wheel in each set of the sets of wheels comprises a multidirectional wheel comprising a plurality of rollers formed around and coupled to a central rim, the multidirectional wheel configured for travel in the direction normal to the main axis of the set of wheels and travel in a lateral direction along and parallel to the main axis of the set of wheels.

20. The handtruck of claim 19, wherein the fixed, acute angle of the handtruck wheel assembly forms an angle of inclination with the first plane of the handtruck frame of between 20 degrees and 70 degrees.

21. The handtruck of claim 19, wherein the handtruck wheel assembly comprises:
a first wheel base coupled to a first side of the handtruck frame and including at least one wheel of a first wheel set of the at least two sets of wheels and at least one wheel of a second wheel set of the at least two sets of wheels; and
a second wheel base coupled to a second side of the handtruck frame opposing the first side and including at least one wheel of the first wheel set and at least one wheel of the second wheel set.

22. A handtruck comprising:
a handtruck frame including a frame base extending to a handle portion of the handtruck frame, the handtruck frame generally lying in a first plane and having a front and a rear;
a load support mounted to the front of the handtruck frame and generally lying in a second plane inclined relative to the first plane; and
a handtruck wheel assembly mounted to the frame base and extending from the frame base at a fixed, acute angle to the first plane, the handtruck wheel assembly comprising at least two sets of wheels coupled to the frame base, each set having a fixed main axis of rotation parallel to the first plane and capable of travel in a direction normal to the main axis, wherein at least one wheel in at least two sets of the at least two sets of wheels comprises a multidirectional wheel comprising a plurality of rollers formed around and coupled to a central rim, the multidirectional wheel configured for travel in the direction normal to the main axis of the set of wheels and travel in a lateral direction along and parallel to the main axis of the set of wheels.

23. The handtruck of claim 22, wherein each wheel of the at least two sets of wheels is a multidirectional wheel.

24. The handtruck of claim 22, wherein the at least two sets of wheels comprise a first front set of wheels comprising a first set of wheels positioned on a first side of the handtruck frame and a second set of wheels positioned on a second side of the handtruck frame opposing the first side.

25. The handtruck of claim 24, further comprising a second rear set of wheels comprising at least one wheel positioned on the first side of the handtruck frame and at least one wheel positioned on the second side of the handtruck frame.

26. The handtruck of claim 25, wherein each wheel of the first front set of wheels has a smaller diameter compared to each wheel of the second rear set of wheels.

27. The handtruck of claim 25, wherein each wheel of the first front set of wheels is a multidirectional wheel and each wheel of the second rear set of wheels is a fixed axis tracking wheel with no lateral rolling capability.

28. The handtruck of claim 27, wherein each wheel of the first front set of wheels has a smaller diameter compared to each wheel of the second rear set of wheels.

29. The handtruck of claim 1, wherein the first set and second set of multidirectional wheels are positioned proximate a front portion of the handtruck frame and wherein the handtruck further comprises at least one wheel positioned proximate a rear portion of the handtruck frame.

30. The handtruck of claim 29, wherein the at least two sets of wheels comprise a first front set of wheels positioned proximate a front portion of the handtruck frame and wherein the handtruck further comprises at least one wheel positioned proximate a rear portion of the handtruck frame.

* * * * *